(12) United States Patent
Hashimoto et al.

(10) Patent No.: US 7,063,634 B2
(45) Date of Patent: Jun. 20, 2006

(54) CHAIN TENSION-IMPARTING DEVICE

(75) Inventors: Hiroshi Hashimoto, Osaka (JP); Osamu Yoshida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 356 days.

(21) Appl. No.: 10/715,740

(22) Filed: Nov. 18, 2003

(65) Prior Publication Data
US 2004/0127316 A1  Jul. 1, 2004

(30) Foreign Application Priority Data
Dec. 27, 2002 (JP) .............................. 2002-379982

(51) Int. Cl.
*F16H 7/08* (2006.01)
(52) U.S. Cl. ..................................... 474/110
(58) Field of Classification Search ................ 474/101, 474/109, 110, 111, 117
See application file for complete search history.

(56) References Cited

U.S. PATENT DOCUMENTS

| 5,234,383 | A | * | 8/1993 | Harada et al. ............... 474/110 |
| 5,601,505 | A | | 2/1997 | Tada |
| 5,713,809 | A | * | 2/1998 | Yamamoto et al. ......... 474/110 |
| 6,120,402 | A | * | 9/2000 | Preston et al. .............. 474/109 |
| 6,244,981 | B1 | | 6/2001 | Simpson |
| 6,808,466 | B1 | | 10/2004 | Yoshida et al. |
| 6,916,264 | B1 | * | 7/2005 | Hashimoto et al. ......... 474/109 |
| 2003/0186764 | A1 | | 10/2003 | Yoshida et al. |
| 2004/0029664 | A1 | | 2/2004 | Yoshida et al. |
| 2004/0029665 | A1 | | 2/2004 | Yoshida et al. |
| 2004/0029666 | A1 | | 2/2004 | Yoshida et al. |
| 2004/0092348 | A1 | * | 5/2004 | Hashimoto et al. ......... 474/109 |
| 2004/0127316 | A1 | | 7/2004 | Hashimoto et al. |
| 2005/0049093 | A1 | * | 3/2005 | Sato et al. ................... 474/101 |
| 2005/0090342 | A1 | * | 4/2005 | Yoshida ...................... 474/101 |

FOREIGN PATENT DOCUMENTS

| GB | 2 385 106 A | 8/2003 |
| JP | 7-317854 | 12/1995 |
| JP | 8-121557 | 5/1996 |
| JP | 2002-139110 | 5/2002 |
| JP | 3350037 | 9/2002 |
| JP | 2004-169850 A | 6/2004 |

* cited by examiner

*Primary Examiner*—Vicky A. Johnson
(74) *Attorney, Agent, or Firm*—Howson and Howson

(57) ABSTRACT

A chain tensioner has a spring-biased plunger with rack teeth engageable with teeth of wedge-shaped cam chips cooperating with a spring-biased cam-receiving ring in a recess formed in a tensioner housing. A seal plate, having a central hole through which the plunger extends, is provided as a closure for the recess to hold the cam chip assembly in place. A wire loop, for temporarily engaging a pin protruding laterally from the plunger, is pivoted in tube formed by rolling a portion of a seal plate. The wire loop holds the plunger in its retracted state while the tensioner is being installed, and automatically disengages the laterally protruding pin when the plunger is pushed inward by a tensioner lever, thereby releasing the plunger for normal operation.

4 Claims, 8 Drawing Sheets

CHAIN TENSION-IMPARTING DEVICE

FIELD OF THE INVENTION

This invention relates to a device for imparting proper tension to a power transmitting chain of the kind used in a vehicle engine. The invention has particular application as a tensioner for a timing chain, which transmits rotation between a crankshaft sprocket and one or more camshaft sprockets.

BACKGROUND OF THE INVENTION

As shown in FIGS. 8 and 9, a chain tension-imparting device 500, recently developed by Tsubakimoto Chain Co., of Osaka, Japan, comprises a generally cylindrical plunger 520, which protrudes toward a traveling chain (not shown); a housing body 510, having a plunger-receiving hole 511, in which the plunger 520 slides retractably; a protrusion biasing spring 530, which biases the plunger 520 in the protruding direction with respect to the housing body 510; a cam-receiving ring 540, fitted around plunger 520 and received in an enlarged end portion 511a of the plunger-receiving hole; a spring 550 for biasing the cam-receiving ring 540 in the protruding direction; a pair of wedge-shaped cam chips 560, which slide on sloping surfaces 541 of cam guiding grooves formed in the cam-receiving ring 540 and engage a pair of racks 521 formed on opposite sides of the plunger 520; a cam guide ring 570, fitted on the outside of the plunger 520 in the enlarged end portion 511a of the plunger-receiving hole 511, for guiding and controlling disengagement of the pair of wedge-shaped cam chips 560 from the racks 521; and a seal plate 580, which slidably fits the plunger 520 and seals the biasing spring 550, the cam-receiving ring 540, the cam chips 560, and the cam guide ring 570, all of which are disposed in the enlarged end portion 511a of the plunger-receiving hole 511. The tension-imparting device is configured so that when the chain becomes elongated, the plunger 520 is advanced sequentially, by one tooth at a time, to restrict the backlash distance of the plunger, so that proper chain tension is maintained, and noise, which would otherwise occur in the chain, is prevented. This device is described on page 1, and shown in FIGS. 2 and 3, of Japanese Patent Application No. 2002-338124.

Since the plunger 520 is biased to protrude from the housing body 510 toward a traveling chain, it is difficult to hold the plunger in its retracted condition during mounting of the tension-imparting device. The objects of the invention are to solve the above-mentioned problem, and to provide a simple chain tensioner which reliably, and automatically, shifts from a condition in which the protrusion of the plunger is blocked to facilitate mounting, to a condition in which the plunger is released for normal tension-imparting operation.

SUMMARY OF THE INVENTION

The tension imparting device in accordance with the invention comprises a housing having a plunger-receiving hole with an enlarged end portion, and a plunger slidable in the hole. The plunger extends through, and protrudes from, the enlarged end portion. The plunger is arranged to exert a tensioning force against a traveling flexible transmission medium. Toothed racks are formed on opposite sides of the plunger. A spring biases the plunger in the protruding direction, and a cam-receiving ring is fitted on the outside of plunger and disposed in the enlarged end portion of the plunger-receiving hole. The cam-receiving ring has a pair of grooves with oblique cam-engaging surfaces. A spring, also disposed in the enlarged end portion of the plunger-receiving hole, biases the cam-receiving ring in the protruding direction. A pair of wedge-shaped cam chips, also disposed in the enlarged end portion of the plunger-receiving hole, are situated respectively in the grooves and engaged with, and slidable on, the oblique, cam-engaging surfaces of the cam-receiving ring. The cam chips have teeth engaged respectively with the toothed racks on the opposite sides of the plunger. A cam guide ring, fitted on the plunger, and also disposed within the enlarged end portion of the plunger-receiving hole, guides and controls disengagement of the pair of wedge-shaped cam chips from the racks. The tension-imparting device also includes a seal plate, having a central opening slidably fitting the plunger, and seals the biasing spring, the cam-receiving ring, the cam chips, and the cam guide ring, all of which are disposed in the enlarged end portion of the plunger-receiving hole. A plunger releasing mechanism, for temporarily holding the plunger in a retracted condition, and responsive to an external pressing force urging the plunger in a retracting direction opposite to the protruding direction, releases the plunger for protruding movement.

In a preferred embodiment, the plunger releasing mechanism comprises a pin protruding laterally from the plunger, a loop-shaped retainer engageable with the pin, and a roll-shaped tube on the seal plate. The loop-shaped retainer is engaged with, and pivoted in, the roll-shaped tube, and movable from a first position, in which it engages the laterally protruding pin and thereby holds the plunger in its retracted condition, to a second position, in which it releases the plunger for protruding movement.

Preferably, the loop-shaped retainer is a resilient element comprising first and second legs. The roll-shaped tube has tapered end surfaces in contact with the legs, and the legs are urged against the tapered end surfaces by the resilience of the resilient element. The tapered end surfaces are tapered in directions such that forces exerted by the tapered end surfaces on the first and second legs, urge the loop-shaped retainer from its first position toward its second position.

Preferably, the seal plate and the roll-shaped tube are formed as a unit from sheet metal, and the roll-shaped tube forms a portion of a border of the central opening of the seal plate.

The tension-imparting device in accordance with the invention can be an "inner-mounting" type tensioner, attached to the inside of an engine in a sealed manner, or an "outer-mounting" type, inserted from the outside of an engine. The tension-imparting device in accordance with the invention may be used not only in for imparting tension to an engine timing chain, but also to impart tension to the chain in other engine systems such as a balancer system, an oil pump drive, or the like. The tension-imparting device is not limited in its applications to transmission chains, and can be used to impart tension to other flexible transmission media such as flexible belts.

When the chain or other flexible transmission medium becomes elongated during engine operation, the backlash distance is controlled by the sequential protrusion of the plunger by the pitch of one rack tooth. Appropriate tension is maintained in the transmission medium, so that foreign sounds occurring upon starting of the engine, and whistling sounds generated as a result of excess tension, are prevented.

The wedge-shaped cam chips block the retracting movement of the plunger by a wedging action in the same way both before and after the cam teeth step over the rack teeth of the plunger allowing the plunger to be indexed in the protruding direction. Thus, the tension imparting device can continue to impart tension to a flexible transmission medium reliably over a long period of engine operation.

DETAILED DESCRIPTION OF THE PREFERRED EMBODIMENTS

Figure 1:
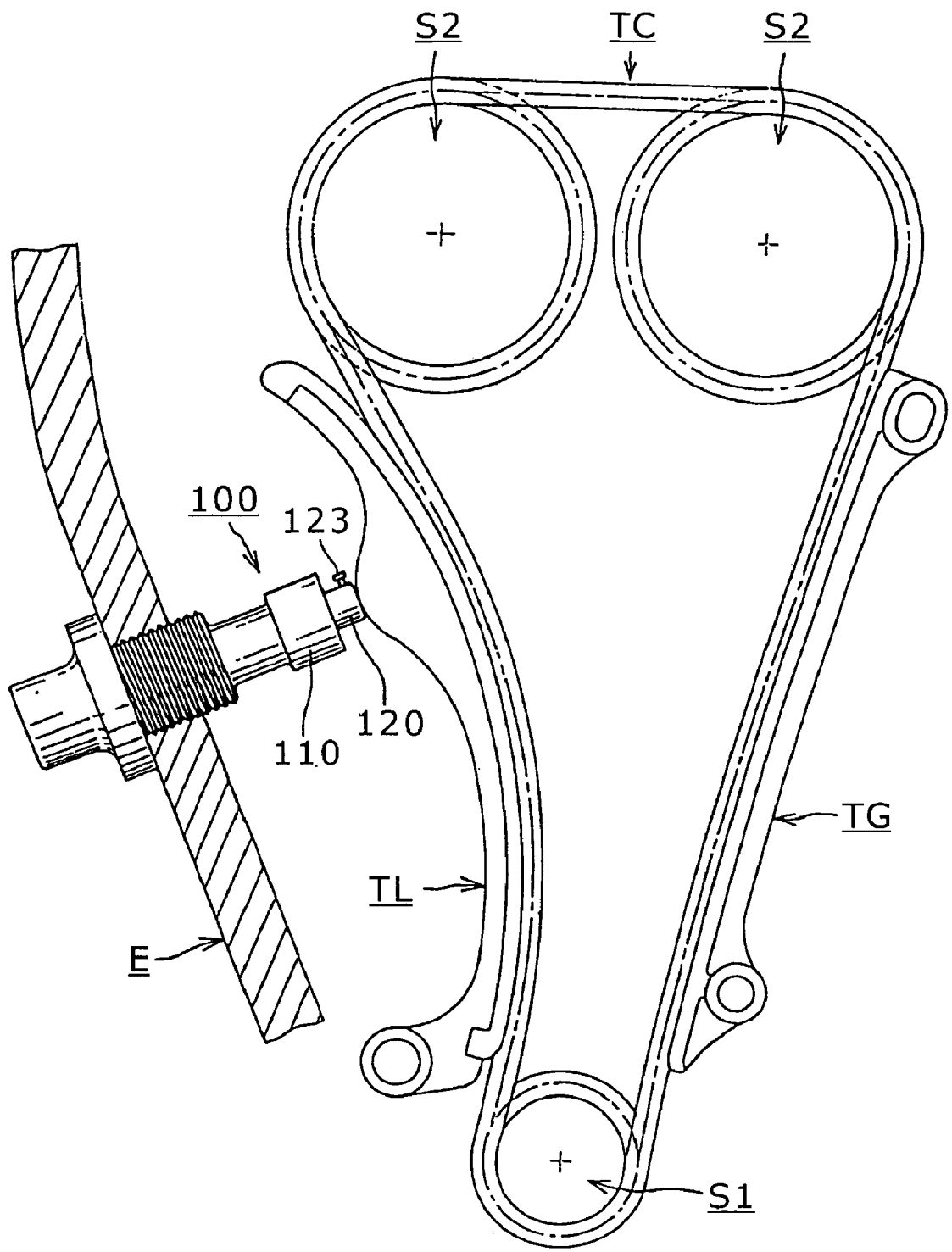
FIG. 1 is a schematic, elevational view showing a chain tension-imparting device in accordance with the invention cooperating with a pivoted tensioner lever to maintain tension in the timing chain of a dual-cam internal combustion engine.

In the embodiment illustrated in FIG. 1, the chain tensioner 100 is of the outer attachment type, being attached from the outside of an engine. The function of the tensioner is to maintain tension in a timing chain TC, and thereby suppress the vibration generated as the timing chain travels around a crankshaft sprocket S1 and camshaft sprockets S2. A generally cylindrical plunger 120 is spring-biased so that it protrudes from the housing 110 in a direction such that it presses a pivoted tensioner lever TL toward the timing chain TC. The housing is attached to an engine block wall E. A shoe surface of the tensioner lever TL is maintained in sliding contact with the slack side of the timing chain TC to impart tension to the chain. A tensioner guide TG, fixed to the engine block wall, guides the tensioned side of the timing chain TC so that the chain TC is prevented from wobbling.

Figure 2:
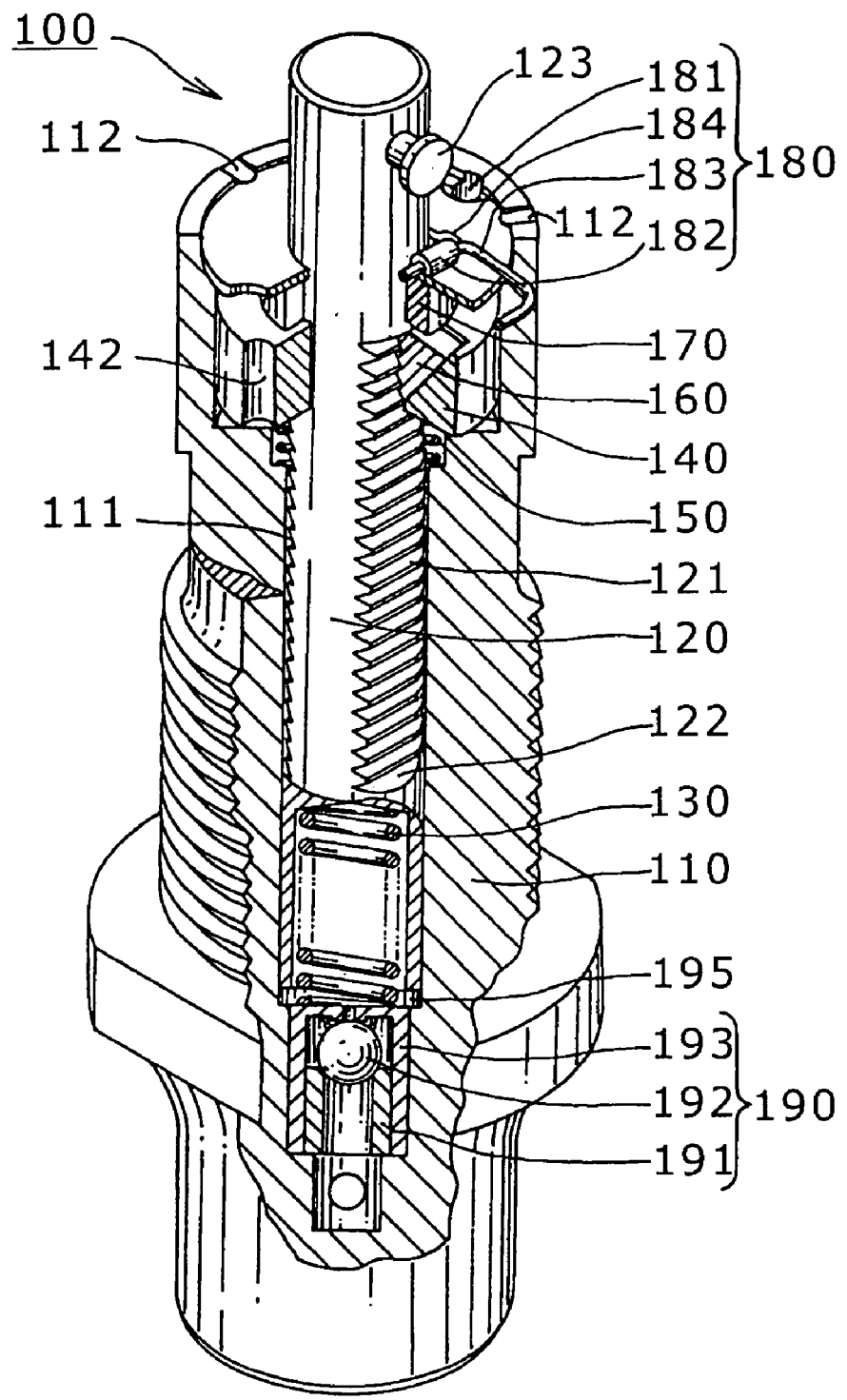
FIG. 2 is a partially cut-away perspective view of a chain tension-imparting device in accordance with the invention.
Figure 3:
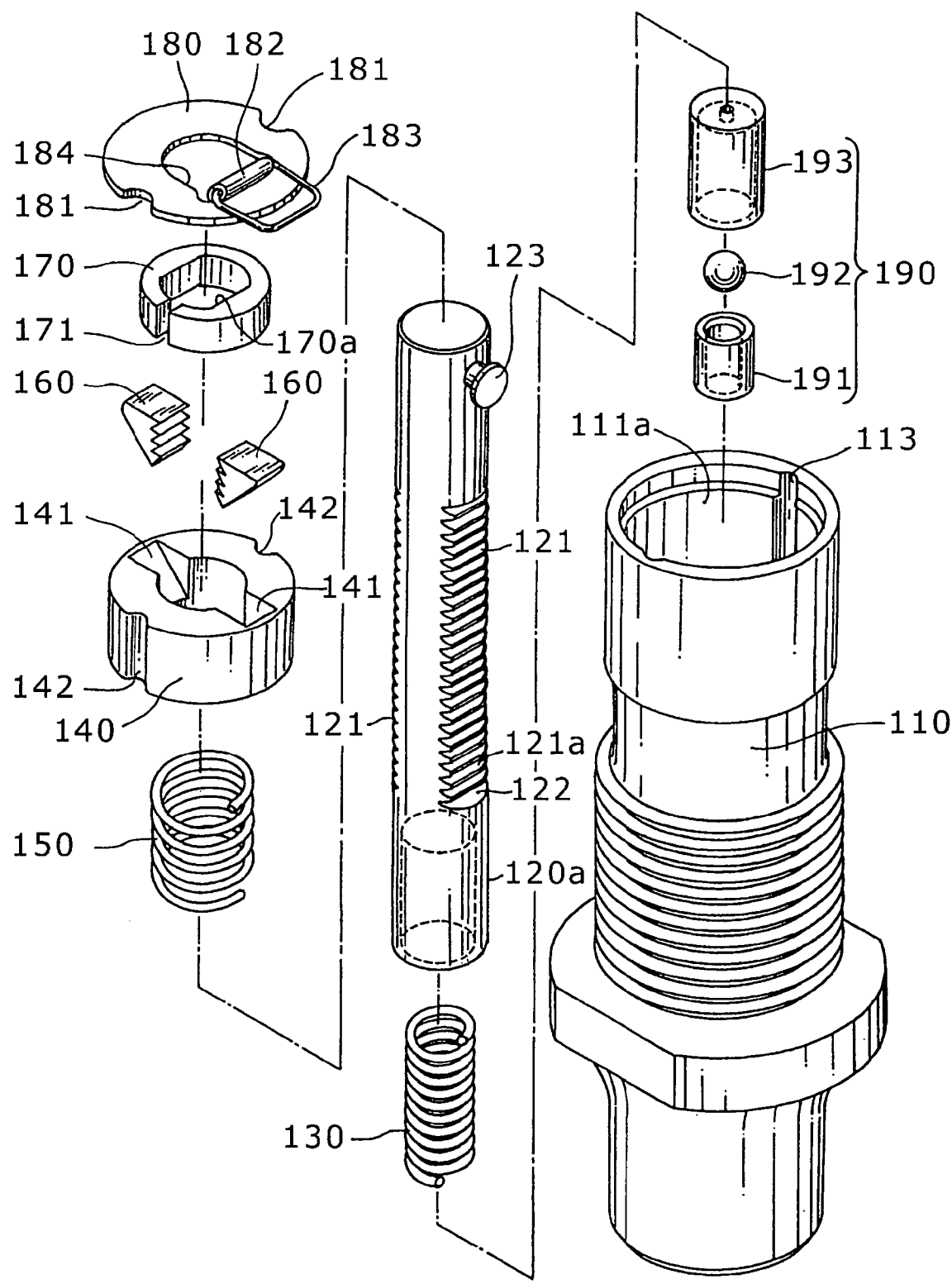
FIG. 3 is an exploded view of the chain tension-imparting device of FIG. 2.

As shown in FIGS. 2 and 3, the plunger 120 is slidable in a hole 111 in the housing 110. A protrusion biasing spring 130 biases the plunger 120 in the protruding direction with respect to the housing 110. A cam-receiving ring 140, surrounding the plunger 120, is disposed an enlarged cylindrical recess 111a, formed at the front end of hole 111 in the housing. The recess 111a is coaxial with the hole 111. A biasing spring 150 urges the cam-receiving ring 140 in the direction of protrusion of the plunger 120. A pair of wedge-shaped cam chips 160 slide on oblique surfaces in cam guide grooves 141 formed in the cam-receiving ring 140. The cam chips have teeth which engage the teeth of racks 121, formed on opposite sides of the plunger. A cam-guide ring 170, also disposed around the plunger, and situated within cylindrical recess 111a, controls disengagement of the wedge-shaped cam chips 160 from the toothed racks 121. A seal plate 180, through which the plunger extends, is fitted to the end of the housing 110, sealing the cam-receiving ring biasing spring 150, the cam-receiving ring 140, the wedge-shaped cam chips 160 and the cam-guide ring 170 in recess 111a. The seal plate 180 is sealed and secured in place in the end of the housing 110 by caulking, seen at 112 in FIG. 2.

The cam guide ring 170 is preferably composed of a synthetic resin. The synthetic resin ring quietly follows the rapid movement of the cam chips 160, suppressing noise and wear which would otherwise occur due to contact with the seal plate 180. However, a metallic cam guide ring can be used as an alternative. The cam guide ring 170 is C-shaped, having an internal surface 170a, which conforms to the shape of the rack portion of the plunger, slidably fitting on the rack tip surfaces 121a of the plunger 120. The ring is provided with a cut-out 171, which allows the ring to be fitted easily onto the racks 121 of the plunger 120 during assembly. The ring controls the disengagement of the pair of wedge-shaped cam chips 160, and, when the plunger is fully extended, engages terminal step portions 122, formed where the innermost ends of the racks meet the outer circumferential surface 120a of the plunger, in order to prevent the plunger from coming out of hole 111. Various other types of guide rings, which perform substantially the same function as ring 170, may be used.

The protrusion biasing spring 130 biases the plunger 120 in the protruding direction in accordance with the tension in the traveling chain. It exerts a biasing force larger than the force exerted by the spring 150 for biasing the cam-receiving ring 140.

The rear end portion of the housing 110 is provided with a hydraulic valve mechanism 190 for causing the pressure of oil from an external oil supply to act on the rear end of the plunger 120 in order to adjust the protrusion biasing force of the plunger 120 accurately. The hydraulic valve mechanism 190 comprises a ball seat 191, press-fit into a retainer 193, a check ball 192, which freely abuts the ball seat 191, and a retainer 193, which limits movement of the check ball 192. The hydraulic valve mechanism 190 allows oil to flow into a high pressure oil chamber 195, formed between hole 111 and the rear end of the plunger 120, but prevents the reverse flow of oil from the high pressure oil chamber 195. Thus the oil pressure accurately imparts tension to, and maintains tension in, the traveling chain.

In the operation of the tensioner, plunger 120 is initially in a "backstopped" position, in which its retracting movement is blocked by the cooperation of the rack teeth with the cam chips, and engagement of the cam-receiving ring with the end wall of recess 111a. When the timing chain TC loosens, the plunger 120, which is biased in a protruding direction by spring 130, is moved forward immediately. At the same time, the cam-receiving ring 140 is displaced in the protruding direction by the biasing force of spring 150, and the pair of wedge-shaped cam chips and the cam-guide ring 170 are displaced toward the back surface of the seal plate 180.

When the cam-guide ring 170 abuts the back surface of the seal plate 180 the wedge-shaped cam chips 160 slide on the oblique cam guide surfaces 141, moving radially outward, pushing the cam-receiving ring 140 in a direction opposite to the protruding direction of the plunger 120. The cam chips 160 move radially outward until their teeth disengage the teeth of the racks 121, releasing the plunger 120 so that it can move forward.

As soon as the cam chips 160 disengage the rack teeth and release the plunger, the cam chips slide in the opposite direction on the oblique cam guides 141 in the cam-receiving ring 140, moving radially inward and re-engaging the rack teeth on the plunger 120 at new positions shifted by one tooth from their previous positions. When the cam chips re-engage the rack teeth, the cam-receiving ring 140 is once again displaced in the protruding direction.

When an external force, pushing the plunger 120 back, is applied by the chain, the wedging action of the cam chips 160 again exerts a backstopping function, blocking retracting displacement of the plunger 120.

Since the hole 110 is concentric with the plunger 120, and the cam-receiving ring 140 is concentric with the recess 111a, even if the plunger rotates in hole 111 as it moves forward and backward in response to variations in chain tension during engine operation, the cam chips 160 and the cam-receiving ring 140 rotate with the plunger and remain aligned with the racks, so that stable engagement between the cam chips and the racks is maintained, and reliable backstopping operation is achieved.

The chain tension imparting device 100 includes a plunger disengagement mechanism comprising openings 181 in the seal plate 180, through which a tool such as hexagonal wrench or the like can be inserted, longitudinal grooves 113 on the inner circumferential wall of recess 111a, which receive the engagement tool, and longitudinal grooves 142 on the outer circumferential surface of the cam receiving ring 140 which face grooves 113 and also receive the engagement tool. After the tensioner is removed from the engine, the disengagement switching mechanism allows the plunger to be reset to a condition in which its tension-maintaining and backstopping functions can be exerted.

Resetting is carried out by inserting a tool, such as a hexagonal wrench or the like, through an opening 181 in the seal plate and into a hole formed by a pair of opposed grooves 113 and 142. Two tools can be inserted in this way. The tool, or tools, lock the cam-receiving ring 140 against rotation in the housing, so that the plunger can be rotated without causing the cam-receiving ring to rotate at the same time. By rotating the plunger 120 through ninety degrees the engagement between the racks of plunger 120 and the wedge-shaped cam chips 160 can be released so that the plunger can be pushed inward against the biasing force exerted by spring 130, and then rotated again through ninety degrees to reengage the rack teeth with the cams.

As shown in FIGS. 4 to 7, the plunger releasing mechanism, comprises a pin 123, a roll-shaped tube 182, which serves as a pivot, and a wire loop 183, which is pivoted in the tubular element, and which engages the pin 123, thereby holding the plunger temporarily in its retracted condition.

The pin 123 protrudes laterally from the outer circumferential portion of the plunger 120, near the outer end of the plunger. The tube 182 is preferably formed as a unitary part of the seal plate by rolling a partially cut-out central portion of the seal plate 180. The loop 183 is pivotally engaged with the roll-shaped tube 182 and hooked on the pin 123.

Figure 7:
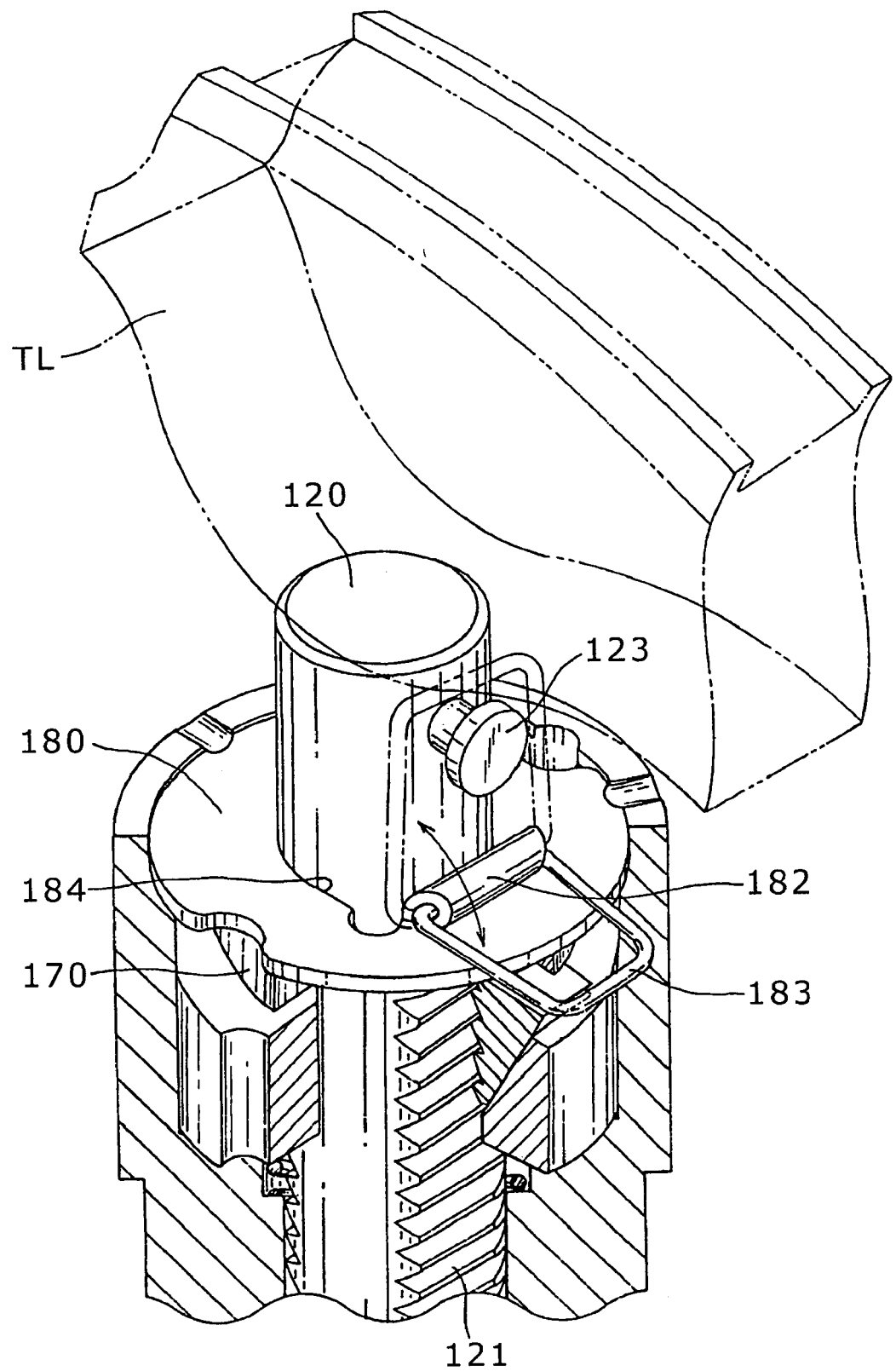
FIG. 7 is a perspective view showing the pivotable loop disengaged from the laterally protruding pin on a plunger and thereby permitting protruding movement of the plunger.
Figure 8:
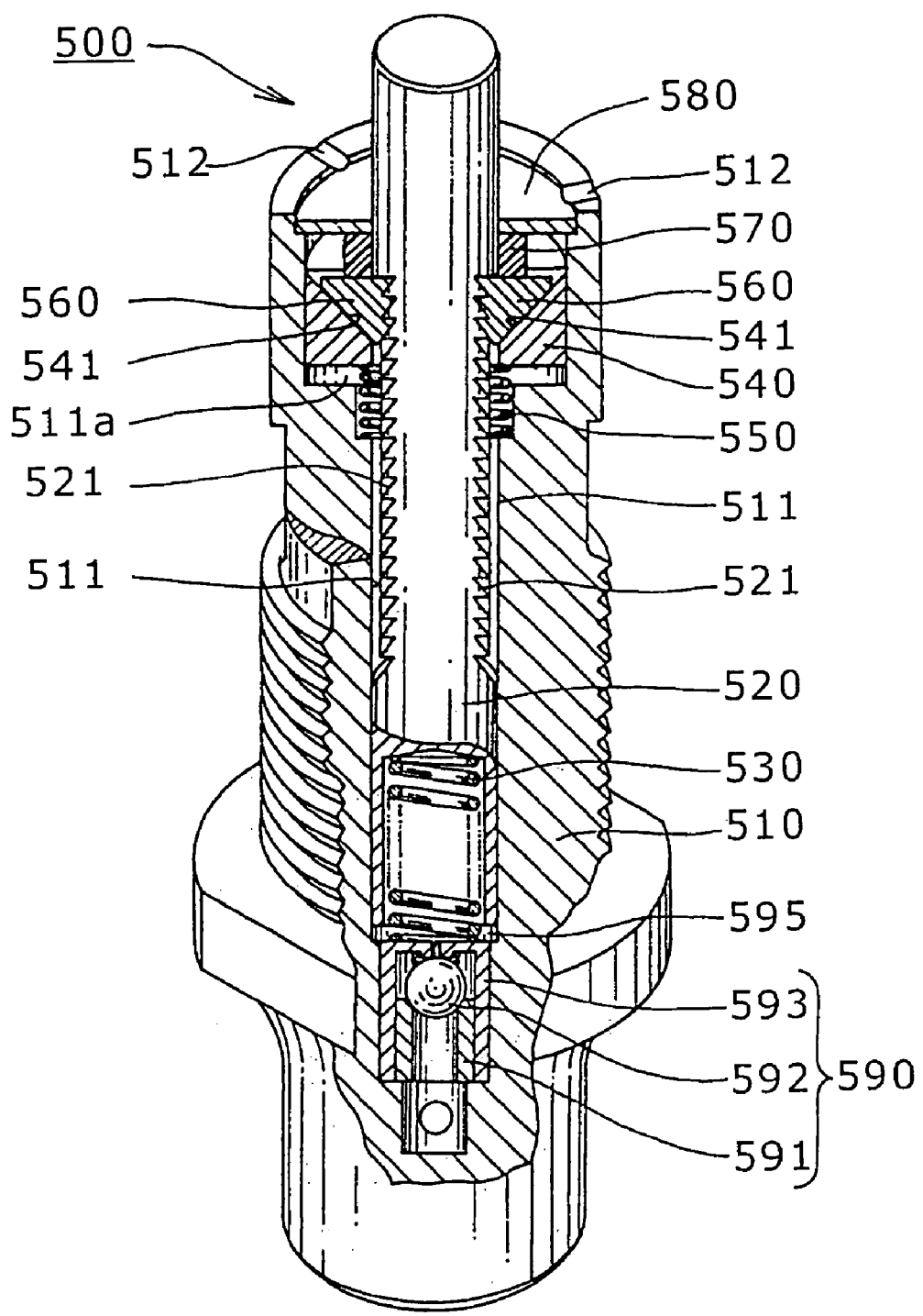
FIG. 8 is a partially cut-away perspective view of a related chain tension imparting device.
Figure 9:
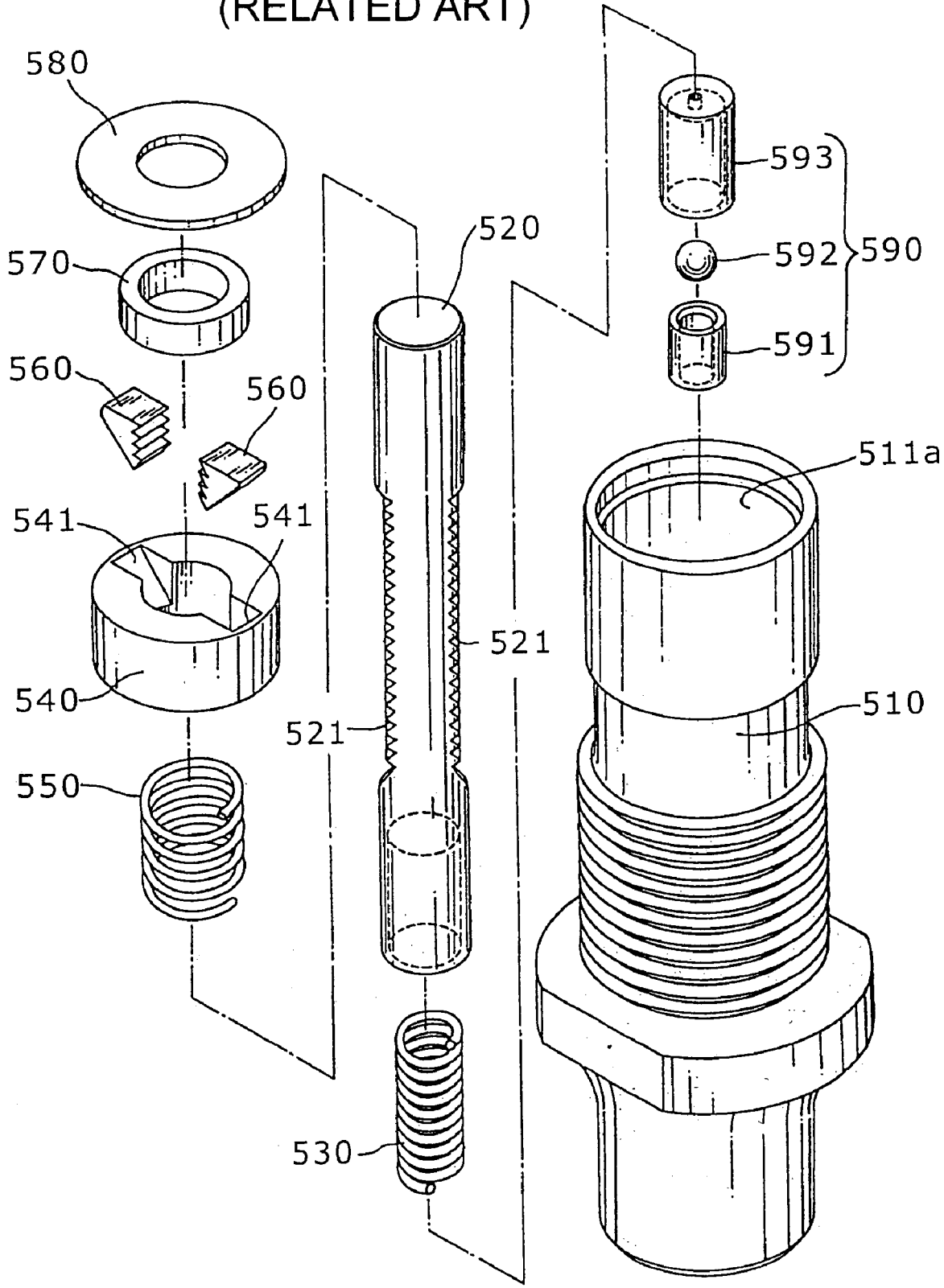
FIG. 9 is an exploded view of the chain tension imparting device shown in FIG. 8.

Release of the loop from the pin 123 occurs automatically when the plunger is pushed inward through at least a part of the backlash distance allowed by the movement of the cam-receiving ring 140 in recess 111a. When disengaged from the pin 123, the loop 183 moves to a position in which it lies against the end of the housing 110, extending laterally from the plunger as shown in FIG. 7.

Figure 4A:
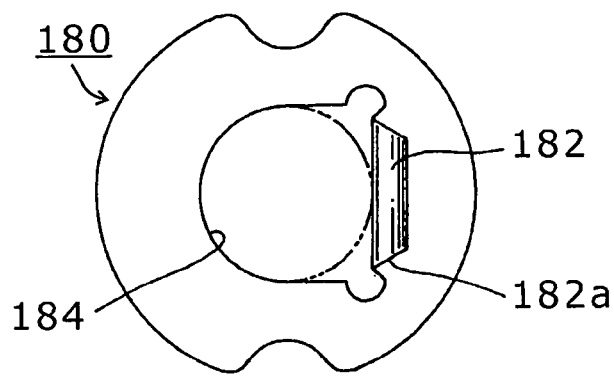
FIG. 4(a) is an elevational view of the seal plate and roll-shaped tube.
Figure 5:
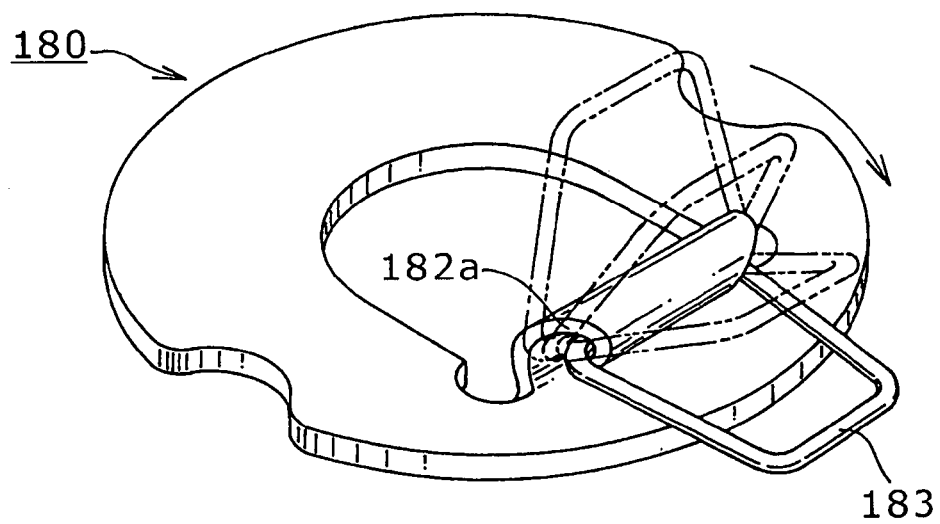
FIG. 5 is a perspective view of the seal plate, the roll-shaped tube and the pivotable loop, illustrating the pivoting movement of the loop as it disengages the plunger of the tensioner.

As shown in FIGS. 4(a) and 5, the roll-shaped tube 182 is formed by partially cutting out a portion of the seal plate 180 to form a central opening 184 for the plunger, and rolling a part of the cut-out portion toward the outer edge of the seal plate so that it forms a part of the boundary of the central opening 184. As shown in FIGS. 4(a) and 5, both ends of the roll-shaped tube 182 have guide surfaces 182a, which are tapered, so that the length of the part of the tube nearest the center of the seal plate is greater than the length of the part of the tube nearest the outer periphery of the seal plate. An advantage of forming the roll-shaped tube as an integral part of the seal plate is that it reduces the number of separate parts needed to assemble the tensioner.

Figure 4B:
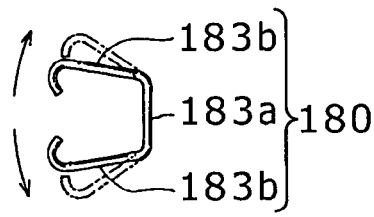
FIG. 4(b) is an elevational view of the protrusion preventing, pivotable loop, showing, in solid lines, the shape of the loop when attached to and pivoted in the roll-shaped tube, and showing, in broken lines, the shape of the loop prior to attachment to the roll-shaped tube.

As shown in FIG. 4(b), the protrusion preventing loop 183 is composed of a generally C-shaped steel wire, having a substantially straight central part 183a joined at its opposite ends, by rounded corners, to two substantially straight leg portions 183b, both having inwardly hooked ends.

As shown in FIG. 4(b) the loop acts as a spring, and its legs 183b can be spread apart to engage their hooked ends with the tube 182 on the seal plate. When the loop 183 is engaged with the pivoting tube 182, and moved toward its upright position as shown in broken lines in FIG. 5, its legs 183b are urged apart from each other by the tapered edges of the tube causing a strain in the loop. The strain is relieved as the loop pivots toward its relaxed condition, as shown in solid lines in FIG. 5. Thus, the loop tends to rotate, by virtue of its own resilience, about its pivot axis, as established by the roll-shaped tube 182, and thus disengages the pin 123 when the head of the pin clears the central part 183a of the loop.

Figure 6:
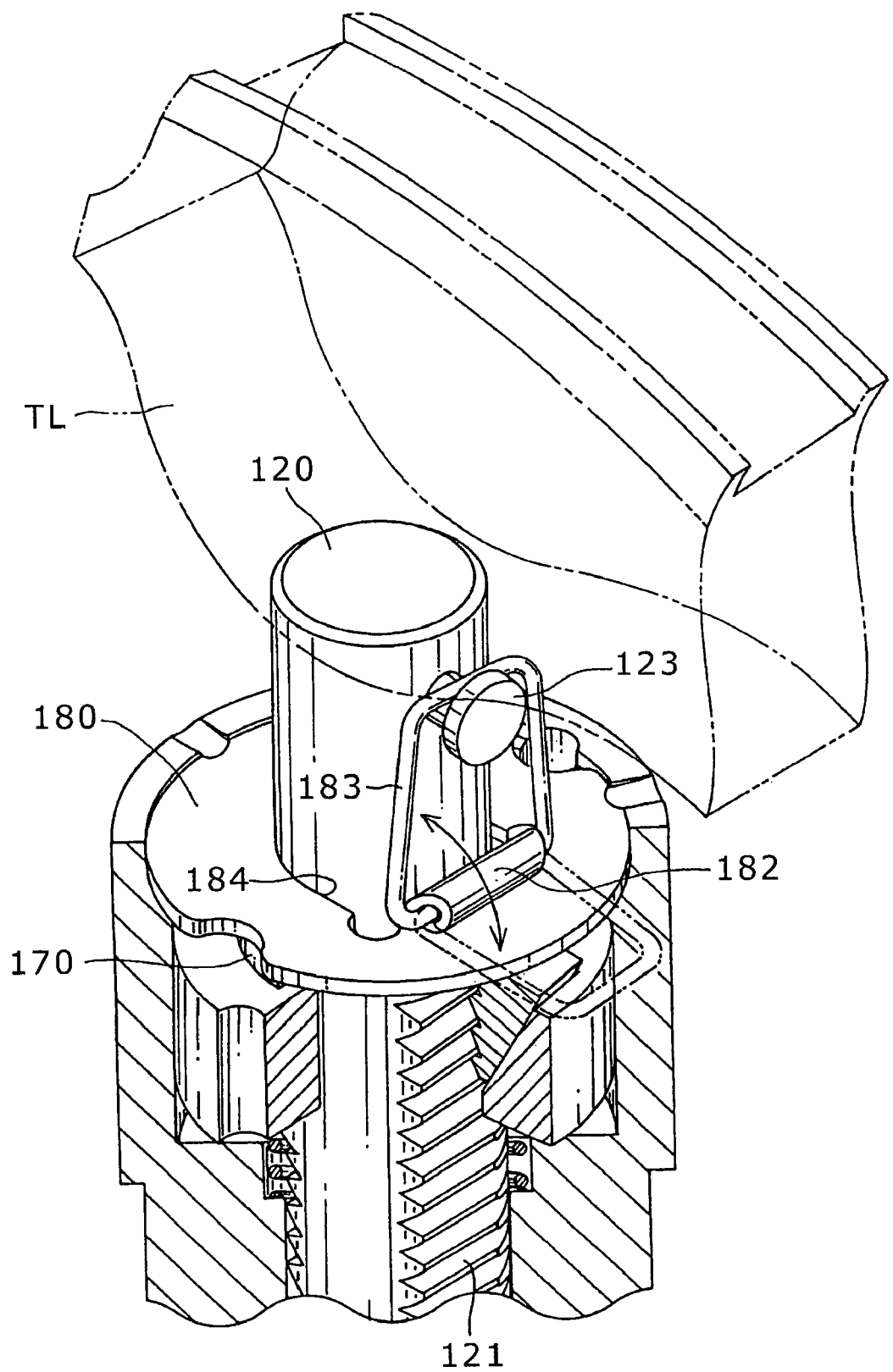
FIG. 6 is a perspective view showing the pivotable loop engaged with the laterally protruding pin on a plunger and thereby preventing protruding movement of the plunger.

When the tensioner as shown in FIG. 6 is installed as a chain tension imparting device in an engine, a pressing force acting on the plunger through a tensioner lever as a result of increased chain tension, causes the loop 183 to disengage the pin 123 automatically, whereupon the loop pivots to the position shown in FIG. 7, where it remains. Thus, the tensioner automatically shifts from the protrusion-blocked condition shown in FIG. 6 to the condition shown in FIG. 7, where the plunger is free to move in the protruding direction as far as permitted by the tensioner lever TL.

Although in the preferred embodiment, as illustrated, the resilient plunger-retaining loop is biased toward its released condition by cooperation of its legs with the tapered ends of the roll-shaped tube in which it is pivoted, alternatively, the loop can be biased toward its plunger-releasing position directly as a result of bending elasticity generated in the leg portions themselves.

The chain tension imparting device 100 exerts an appropriate backstopping function such that noise due to wobbling of the chain is prevented, and whistling sounds due to excessive tension resulting from excessive protrusion of the plunger, are also prevented. Thus, appropriate chain tension can be maintained, and at the same time, even if rotation of the plunger is induced by expansion and contraction of the protrusion biasing spring when the plunger moves forward and backward in accordance with variations in chain tension, the wedge-shaped cam chips 160 and the cam ring 140 rotate together with the plunger 120 so that the cam chips 160 maintain stable engagement with the racks 121 of the plunger 120. In this way, the chain tension imparting device prevents one-sided wear and tooth chipping, and exhibits a high degree of durability.

The plunger disengagement switching mechanism, in which a tool can be inserted through the seal plate and into cooperating grooves formed in the housing wall and the cam-receiving ring, in order to lock the cam-receiving plate against rotation, allows the plunger to be rotated without also rotating the cam-receiving ring. With the cam-receiving ring thus locked, the plunger can be rotated in order to disengage the cams from the rack teeth, thereby permitting resetting of the tensioner when the plunger has reached either its limit, or an intermediate stage in its range of protruding movement. Thus, the device can be reset when removed for maintenance, checking, adjustment and the like.

In the plunger releasing mechanism shown in FIGS. 4 to 7, a pin projecting laterally from the plunger is retained by a loop pivoted in a roll-shaped tube to facilitate easy mounting of the tensioner. The roll-shaped tube is formed by partially cutting and rolling a part of the central portion of the seal plate. When the tensioner is installed in an engine, the retaining loop reliably pivots to its disengaged position automatically when the plunger is pushed inward for a first time during engine operation.

The chain tension imparting device may use alternative structures other than the one specifically described, provided that the protrusion blocking condition of the plunger is reliably released upon application of an external pressing force to the plunger.

In the chain tension-imparting device of the invention, when a chain is elongated during engine operation, the appropriate backlash distance is maintained by progressive projecting movements of the plunger so that foreign sounds occurring upon starting of the engine, and whistling sounds which are as a result of excess tensioning of the chain, are prevented. The wedging action of the cam chips, which effect the backstopping action of the plunger, takes place uniformly as the plunger progresses in the projecting direction by one rack tooth at a time. Thus, the plunger continues to impart appropriate tension to the chain at all times during engine operation.

We claim:

1. A tension-imparting device comprising:
   a housing having a plunger-receiving hole with an enlarged end portion;
   a plunger slidable in said hole, extending through said enlarged end portion, and protruding therefrom in a protruding direction, for exerting a tensioning force against a traveling flexible transmission medium;
   toothed racks formed on opposite sides of the plunger;
   a protrusion biasing spring biasing the plunger in the protruding direction;
   a cam-receiving ring fitted on the outside of plunger and disposed in said enlarged end portion of the plunger-receiving hole, said cam-receiving ring having a pair of grooves with oblique cam-engaging surfaces;
   a spring, also disposed in said enlarged end portion, biasing the cam-receiving ring in said protruding direction;
   a pair of wedge-shaped cam chips, also disposed in said enlarged end portion of the plunger-receiving hole, the cam chips being situated respectively in said grooves and engaged with, and slidable on, said oblique, cam-engaging surfaces of the cam-receiving ring, said cam chips having teeth engaged respectively with said toothed racks on opposite sides of the plunger;
   a cam guide ring, fitted on the plunger, and also disposed within the enlarged end portion of the plunger-receiving hole, for guiding and controlling disengagement of the pair of wedge-shaped cam chips from said racks;
   a seal plate having a central opening slidably fitting the plunger, and sealing the biasing spring, the cam-receiving ring, the cam chips, and the cam guide ring, all of which are disposed in the enlarged end portion of the plunger-receiving hole; and
   a plunger releasing mechanism, for temporarily holding the plunger in a retracted condition, and responsive to an external pressing force urging the plunger in a retracting direction opposite to the protruding direction, for releasing the plunger for protruding movement,
   in which said plunger releasing mechanism comprises a pin protruding laterally from the plunger, a loop-shaped retainer engageable with said pin, and a roll-shaped tube on the seal plate, said loop-shaped retainer being engaged with, and pivoted in, said roll-shaped tube, and movable from a first position, in which it engages said laterally protruding pin and thereby holds the plunger in its retracted condition, to a second position, in which it releases the plunger for protruding movement.

2. A tension-imparting device according to claim 1, in which said loop-shaped retainer is a resilient element comprising first and second legs, in which the roll-shaped tube has tapered end surfaces in contact with said legs, in which said legs are urged against said tapered end surfaces by the resilience of said element, and in which the tapered end surfaces are tapered in directions such that forces exerted by said tapered end surfaces on said legs, urge the loop-shaped retainer from said first position toward said second position.

3. A tension-imparting device according to claim 1, in which said seal plate and said roll-shaped tube are formed as a unit from sheet metal.

4. A tension-imparting device according to claim 3, in which said roll-shaped tube forms a portion of a border of said central opening of the seal plate.

* * * * *